M. TIBBETTS.
DIFFERENTIAL GEARING FOR MOTOR VEHICLES.
APPLICATION FILED JUNE 14, 1910.
1,190,687.
Patented July 11, 1916.
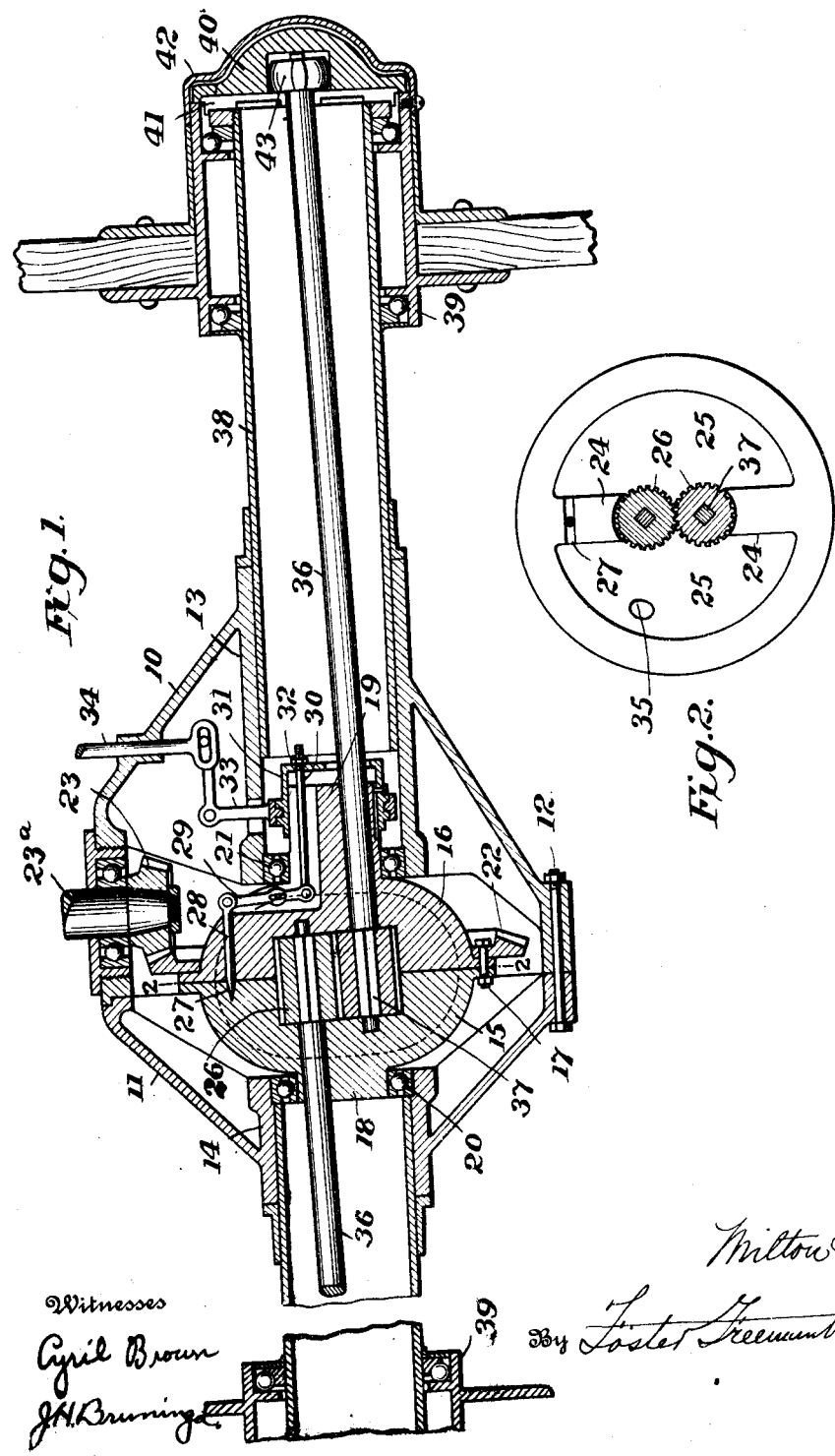

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

DIFFERENTIAL GEARING FOR MOTOR-VEHICLES.

1,190,687.  Specification of Letters Patent.  Patented July 11, 1916.

Application filed June 14, 1910. Serial No. 566,886.

*To all whom it may concern:*

Be it known that I, MILTON TIBBETTS, a citizen of the United States, and resident of Detroit, county of Wayne, State of Michigan, have invented certain new and useful Improvements in Differential Gearing for Motor-Vehicles, of which the following is a specification.

This invention relates to differential or balance gearing, and particularly to two-gear differential gearing for motor vehicles. What may properly be termed a "two-gear differential mechanism" includes, first a differential gear support, second, a pair of meshing gears, third, axles or shafts for the gears and fourth, a pair of universal joints on the ends of the shafts. In such differentials as heretofore used, these joints have been placed usually within the differential support or at all events contiguous to the gears, resulting necessarily in great angularity at the joints and consequent friction and wear. In the present invention this angularity is very slight due to the fact that the universal joints have been placed in the widely separated driven members of a motor vehicle axle or jack shaft, thus permitting of a more simple form of universal joint and reducing friction and wear.

One of the objects of this invention is to construct a differential which will have a minimum number of parts, and therefore will be simple in construction and cheap to manufacture.

Another object is to provide a motor vehicle driving axle with a differential mechanism of a novel and simple construction and in which the road wheels may be slightly inclined to the vertical.

Another object is to provide a motor vehicle driving axle with a two-gear differential in which the axle sections are axially removable.

Another object is to construct the differential so that it may be retarded or locked and to construct the means for locking it so that it can be thrown into and out of operation.

These and other objects of the invention will appear from the detail description.

The invention will be described in connection with the accompanying drawings, in which, Figure 1 is a longitudinal section through a differential, its housing, and the driven members; and Fig. 2 is a section on the line 2—2, Fig. 1.

In the form of the invention shown, and which has been chosen for illustrative purposes, the invention not being limited to the exact construction, the casing or support for the differential mechanism is a motor vehicle axle comprising a hollow rigid supporting structure composed of sections 10 and 11 detachably secured together by bolts 12 and being formed with inturned sleeves 13 and 14 into which tubes 38 extend and are rigidly secured by riveted or driven joints. Road wheels 39 constitute driven members rotatably mounted at the ends of the casing, and as shown they are wholly supported on the non-rotating axle or casing upon separated bearings 39'. The inturned sleeves above referred to also provide supports for bearings 20 and 21 in which are rotatably mounted the hubs 18 and 19 of a differential gear support which, as shown, is in two halves 15 and 16 secured together as by bolts 17 which also secure a bevel gear wheel 22 to the differential support. Said gear wheel 22 is driven by a pinion 23 on a driving shaft 23ª which is also supported in bearings in the casing.

A two-gear differential mechanism which includes the support 15, 16, connects the driven members or wheels 39 and is arranged with its universal joints in the hubs of the road wheels. By such mechanism the road wheels are adapted to be driven, differentially, from the driving shaft 23ª above referred to. Also, by arranging the universal joints of the differential mechanism in the road wheels as shown herein and as will be described more in detail, the wheels 39 may if desired be inclined to the vertical to give more room for the vehicle body between the upper parts of the wheels, without the use of any additional universal joints. The two gears of the differential mechanism are mounted in constant mesh with each other in the support 15, 16, being shown as spur gears and indicated at 26, and it will be seen that they are arranged diagonally in the support so that their extended axes will intersect the center lines of the road wheel bearings within the hubs of said wheels. Shafts or axle sections 36 extend between said gears and the hubs of the road wheels, being shown as removably connected to their respective gears and connected to the wheel hubs by universal joints. These shafts which may also be termed axle sections or live axles, and which are out of alinement with each other are given a gyratory driving movement by the driving mechanism mounted at the middle of the axle. They are journaled in the hubs of the differential support which holds their inner ends out of the axis of rotation of the wheel hubs. Said inner ends are angular in shape, as shown at 37, so as to connect with the gears 26 and the outer ends of the shafts are in the form of angularly shaped heads 43 which engage similarly shaped recesses in pieces 40 which are removably secured to the outer ends of the hubs of the road wheels as by hub caps 42 and which form a driving connection with the wheels through interlocking projections and recesses 41 on the hubs and pieces 40. The heads 43 preferably have a loose fit with the recesses in the pieces 40, or they may be rounded as shown in Fig. 1, so that they will form with the recesses a universal joint.

It will be understood that the gears 26 are supported independently of the shafts so that they will remain in place when the shafts are withdrawn, also that said shafts may be withdrawn by removing the caps 42 and the pieces 40, and as easily replaced, without disturbing either the gears 26 or the differential support 15, 16.

For the purpose of providing a retarding means for the operation of the differential, the sections 15 and 16 are hollow, as shown in the drawings, and are divided into compartments or chambers 25 by means of inwardly extending partitions 24. Between these partitions is a passageway in which the intermeshing differential gears 26 are closely mounted. There is also a port or passage 27 connecting the compartments on opposite sides of the partitions. This port is arranged to be closed by a needle valve 28 which is connected to a lever 29 pivoted upon the differential support and connected to a rod 30 extending through a sleeve 31, which is splined upon the hub 19. The rod 30 and the sleeve 31 are arranged to be adjusted relatively by means of a nut 32 on the rod 30, which engages the end of the sleeve. The sleeve is arranged to be moved axially on the hub 19 by means of a bell crank lever 33 operated by a rod 34 which may be suitably connected to the steering gear (not shown) of the motor vehicle so that the passage 27 is open only while the vehicle is turning corners. In order that the chambers 25 formed in the differential support may be filled with or drained of a suitable liquid, an opening having a removable cap 35 is provided.

In the operation of the mechanism shown in Fig. 1 in which the axes of the wheels are in line instead of inclining slightly as they may be constructed with this mechanism without any change in form whatever, it will be understood that when the driving wheels are rotating in unison, as when the vehicle is moving in a straight line and the traction of the wheels is the same, there will be no relative movement whatever between the various elements of the differential mechanism, including the support 15, 16, the gears 26, the shafts 36 and the universal joints at 43, or between any of those elements and the wheels. In other words, there is no relative rotation of the shafts 36 and no movement, and consequently no wear, in the universal joints. The inner ends of the shafts being held out of alinement with the axis of rotation of the wheel hubs and connected by the gears 26, act in the nature of cranks, and are gyrated by the differential support thereby carrying the wheels around with them. But if there is a relative movement of the wheels, as when the vehicle is turning, there is a relative rotation of the gears 26 and their respective shafts 36 about their own axes and the universal joints act to adjust the shafts and wheels to the new relation. By filling the chambers 25 of the differential support with a suitable fluid, as oil, the gears 26 will act as an ordinary gear pump whenever there is any relative movement of the wheels, and transfer the oil from one chamber to the other. If the passage or port 27 is open the oil will readily return therethrough, thus permitting free movement of the gears, but if the port is closed or partly closed by the valve 28 the oil will be restricted in its return, and since the oil is not compressible to any extent, the movement of the differential gears will be retarded or the gears locked depending upon the exact position of the valve 28 and the leakage, if any. Since the movement of the differential gears is only necessary when turning corners, the rod 34 is preferably connected with the steering gear so that when the steering gear is turned the differential will be unlocked and when the steering gear is straight or approximately so, the differential will be locked. If the differential is locked and one wheel is off the ground or on a slippery place spinning of the wheel will be prevented.

It will be understood that the invention may also be applied to the counter or jack shaft of a chain driven vehicle, in which case the road wheels will be replaced by sprocket wheels which are connected by chains to the road wheels. It is to be understood therefore that the term "driven members" is to be construed as a broad term, so as to include both the constructions described and also equivalent constructions.

It will be noted that the axle sections or shafts are flexibly connected at their outer ends to the driven members, and inflexibly connected at their inner ends with the gears 26. Any suitable form of flexible joint may be used.

It is obvious that various changes may be made in the details of construction without departing from this invention, and it is therefore to be understood that this invention is not to be limited to the specific construction shown and described. It is also obvious that some features of the invention are adapted to other forms of gearing or driving mechanism in which the particular form of differential gearing is not used.

Having thus described my invention what I claim and desire to secure by Letters Patent, is:—

1. In a differential mechanism, the combination with a pair of intermeshing gears, said pair of gears comprising all the gears of the differential mechanism, of fluid retarding means therefor.

2. In differential mechanism, the combination with a housing, of a pair of intermeshing gears therein, said pair of gears comprising all the gears of the differential mechanism, said housing being adapted to contain a fluid, and means within the housing coöperating with said gears to circulate the fluid and retard the movements of said gears.

3. In differential mechanism, the combination with a housing divided to form chambers and provided with a passage between the chambers, of a pair of intermeshing gears in said passage, and there being a controlling port between said chambers, said gears comprising all the gears of the differential mechanism.

4. In differential mechanism, the combination with a housing divided to form chambers and provided with a passage between the chambers, of a pair of intermeshing gears in said passage, and there being a port between said chambers, a valve for controlling said port, and means to open and close said valve, said plurality of gears comprising all the gears of the differential mechanism.

5. In differential gearing, the combination with a housing provided with a chamber, of radial partitions for said chamber forming a passage, a pair of intermeshing gears arranged in said passage, and coöperating with said partitions to form a pump, and one of said partitions having a controlled port therein.

6. In a differential gearing, the combination of a housing adapted to contain a liquid and having hubs on opposite sides thereof mounted in bearings, a partition in the plane of the axis of said hubs and dividing the interior of said housing in two separate chambers, intermeshing gears journaled in said partition, driven members, shafts extending through said hubs and engaging said gears and having a universal joint connection with said driven members, and a valve-controlled port through said partition and adapted to establish communication between said chambers.

7. A differential gearing for motor vehicles, comprising a housing adapted to contain a liquid, means for supporting said housing for rotation, a partition in said housing and dividing the interior thereof into two separate chambers, a pair of differential gears journaled in said partition and adapted to force the liquid from one of said chambers to the other, and valve-controlled means for establishing communication between said chambers.

8. A differential gearing for motor vehicles comprising a housing adapted to contain a liquid, means for supporting said housing for rotation, a partition in said housing and dividing the interior thereof into two separate chambers, a pair of differential gears journaled in said partition and adapted to force the liquid from one of said chambers to the other, a passage for conveying liquid from one of said chambers to the other counter to the flow due to the gears, a valve in said passage, and means for actuating said valve.

9. In a motor vehicle, the combination with a non-rotating axle and road wheels mounted at the ends thereof, of a two gear differential mechanism comprising a pair of diagonally arranged meshing gears, a pair of universal joints in the hubs of the road wheels, and non-flexible shafts extending directly from the gears to the universal joints, respectively.

10. In a motor vehicle, the combination with a non-rotating casing and driven members mounted on bearings at the ends thereof and having hubs, of a differential gear support, a pair of intermeshing gears mounted diagonally in said support so that their extended axes will intersect the center line of said bearings within said hubs, and shafts extending between said gears and said hubs respectively, and connected to the latter by universal joints.

11. In a motor vehicle, the combination with a non-rotating axle and road wheels mounted on bearings at the ends thereof, of a differential gear support, a pair of intermeshing gears mounted diagonally in said support so that their extended axes will intersect the center line of said bearings within the hubs of the road wheels, and shafts extending between said gears and said road wheel hubs respectively, and connected to the latter by universal joints.

12. In a motor vehicle, the combination with a non-rotating axle and road wheels mounted in bearings at the ends thereof, of a differential gear support, a pair of intermeshing gears mounted diagonally in said support so that their extended axes will intersect the center line of said bearings within the hubs of the road wheels, and endwise removable shafts extending between said gears and said road wheel hubs respectively, and connected to the latter by universal joints.

13. A rear axle construction for vehicles comprising a hollow, rigid supporting axle carrying wheel hubs at its outer ends, two live axles out of alinement with each other each having an angular head at the outer end thereof, a cap connected with the wheel hub and operatively connecting each of said wheel hubs with the heads on the live axles, means for holding the inner ends of the live axles out of the axis of rotation of the wheel hubs, and means to connect the inner ends of said live axles to permit one to rotate around and in a different direction from the other.

14. A rear axle construction for vehicles comprising a rigid supporting axle having a wheel hub mounted thereon at each end thereof, two live axles out of alinement with each other within said rigid axle, each having an angular head on its outer end, means to loosely connect each live axle with the adjacent wheel hub, means to hold the inner ends of said axles out of alinement with the axis of rotation of the wheel hubs, a gear carried by the inner end of each live axle and in mesh with the gear on the adjacent live axle, and means to rotate said shafts to drive the wheel hubs.

15. A rear axle construction for vehicles comprising a rigid supporting axle having wheel hubs at its outer end, a revoluble sleeve within the rigid axle, means to rotate said sleeve, two live axles out of alinement with each other extending into the sleeve each axle having its axis out of alinement with the axis of rotation of the wheel hubs and having an angular head on its outer end, means connected with the wheel hubs for operatively and loosely connecting the angular head with the wheel hub, and means at the adjacent ends of the two live axles for permitting them to rotate in reverse directions when required and also to permit the inner ends of said axles to rotate around each other.

16. The combination with a hollow supporting axle, and wheels rotatably mounted at the outer ends thereof, of a differential gear support mounted to rotate in said axle, axle sections out of alinement with each other and extending from the wheel hubs to said gear support, universal joints connecting the outer ends of said axle sections with their respective wheel hubs, gears within said support connecting the inner ends of said axle sections and permitting relative rotation thereof in reverse directions, and means for rotating said gear support.

17. The combination with a hollow supporting axle, and wheels rotatably mounted and wholly supported upon the outer ends of said axle, of a differential gear support mounted to rotate in said axle, axle sections out of alinement with each other and extending from the wheel hubs to said gear support, loose driving connections between the outer ends of said axle sections and their respective wheel hubs, gears connecting the inner ends of said axle sections and permitting relative rotation thereof in reverse directions, and means for rotating said gear support.

18. The combination with a two-gear differential mechanism comprising a differential gear support, a pair of diagonally arranged shafts geared together and having their inner ends mounted in said support, and universal joints at the outer ends of said shafts, of a non-rotating vehicle axle supporting said differential mechanism and having wheels rotatably mounted at its outer ends, said universal joints being located within the hubs of said wheels, means connecting said universal joints with said wheel hubs, and means for rotating said differential gear support.

19. The combination with a hollow supporting axle and wheels mounted at the outer ends thereof, of axle sections in said supporting axle out of alinement with each other and extending from the wheel hubs inwardly toward the middle of the axle, universal joint connections between the axle sections and the respective wheel hubs, means for holding the inner ends of the axle sections out of the axis of rotation of the respective wheel hubs, and means for operating said axle sections while permitting differential action between them.

20. The combination with a hollow supporting axle and wheels mounted at the outer ends thereof, of axle sections in said supporting axle out of alinement with each other and extending from the wheel hubs inwardly toward the middle of the axle, universal joint connections between the axle sections and the respective wheel hubs, and means at the middle of the supporting axle for imparting to said axle sections a gyratory driving movement while permitting differential action between them.

21. The combination with a hollow supporting axle and wheels mounted at the outer ends thereof, of axle sections in said supporting axle out of alinement with each other and extending from the wheel hubs inwardly toward the middle of the axle, universal joint connections between the axle sections and the respective wheel hubs, driving mechanism supported in bearings at the middle of the supporting axle, and means connecting said driving mechanism to said axle sections for operating the latter and for holding the inner ends of the axle sections out of the axis of rotation of the respective wheel hubs and permitting differential action between them.

22. The combination with a hollow supporting axle and wheels rotatably mounted at the outer ends thereof, of axle sections out of alinement with each other and each out of alinement with the axis of rotation of the wheels, means including universal joints connecting the outer ends of said axle sections with the respective wheel hubs, rotatable driving mechanism in said axle, connections from said driving mechanism to the inner ends of said axle sections for imparting a gyratory movement to said axle sections, and means for rotating said driving mechanism.

In testimony whereof I affix my signature in presence of two witnesses.

MILTON TIBBETTS.

Witnesses:
GEO. A. SCHROEDER,
E. H. KING.